United States Patent
Lee et al.

(10) Patent No.: US 10,385,277 B2
(45) Date of Patent: Aug. 20, 2019

(54) CATALYST FOR PRODUCING HYDROGENATED BIODIESEL AND METHOD OF PRODUCING THE SAME

(71) Applicants: SK Innovation Co., Ltd., Seoul (KR); SK Energy Co., Ltd., Seoul (KR)

(72) Inventors: Sang Il Lee, Daejeon (KR); Do Woan Kim, Daejeon (KR); Hee Jung Jeon, Daejeon (KR); Sang Jun Ju, Busan (KR); Jae Wook Ryu, Daejeon (KR); Gyung Rok Kim, Daejeon (KR); Seung Hoon Oh, Seoul (KR)

(73) Assignees: SK INNOVATION CO., LTD., Seoul (KR); SK ENERGY CO., LTD., Seoul (KR)

( * ) Notice: Subject to any disclaimer, the term of this patent is extended or adjusted under 35 U.S.C. 154(b) by 58 days.

(21) Appl. No.: 15/198,350

(22) Filed: Jun. 30, 2016

(65) Prior Publication Data

US 2016/0369172 A1    Dec. 22, 2016

Related U.S. Application Data

(62) Division of application No. 13/578,225, filed as application No. PCT/KR2010/007184 on Oct. 20, 2010, now abandoned.

(30) Foreign Application Priority Data

Feb. 11, 2010    (KR) .................. 10-2010-0012711

(51) Int. Cl.
*C10G 3/00*    (2006.01)
*B01J 23/28*    (2006.01)
(Continued)

(52) U.S. Cl.
CPC .............. *C10G 3/46* (2013.01); *B01J 21/063* (2013.01); *B01J 21/066* (2013.01); *B01J 23/28* (2013.01);
(Continued)

(58) Field of Classification Search
CPC combination set(s) only.
See application file for complete search history.

(56) References Cited

U.S. PATENT DOCUMENTS

| 4,743,574 A | 5/1988 | Morales et al. |
| 4,992,605 A | 2/1991 | Craig et al. |

(Continued)

FOREIGN PATENT DOCUMENTS

| CN | 101326266 A | 12/2008 |
| CN | 101583694 A | 11/2009 |

(Continued)

OTHER PUBLICATIONS

International Search Report, PCT/KR2010/007184, dated Jul. 28, 2011 (4 pages).

(Continued)

*Primary Examiner* — Ellen M McAvoy
*Assistant Examiner* — Chantel L Graham
(74) *Attorney, Agent, or Firm* — Abelman, Frayne & Schwab

(57) ABSTRACT

Disclosed herein is a catalyst for producing biodiesel, including a carrier having water resistance and an active component supported on the carrier and used in a hydrotreating reaction or a decarboxylation reaction. Since the catalyst for producing biodiesel includes a carrier having strong water resistance, the deactivation of the catalyst due to the water produced through a process of producing HBD can be prevented, thus remarkably improving the long term stability of a catalyst.

14 Claims, 1 Drawing Sheet

(51) Int. Cl.
- *B01J 37/02* (2006.01)
- *B01J 23/885* (2006.01)
- *B01J 23/888* (2006.01)
- *C10L 1/08* (2006.01)
- *B01J 23/883* (2006.01)
- *B01J 21/06* (2006.01)
- *B01J 23/882* (2006.01)
- *B01J 23/887* (2006.01)
- *B01J 38/18* (2006.01)
- *C10L 1/02* (2006.01)
- *C11C 3/12* (2006.01)
- *B01J 23/30* (2006.01)
- *B01J 23/34* (2006.01)
- *B01J 23/42* (2006.01)
- *B01J 23/44* (2006.01)
- *B01J 23/46* (2006.01)
- *B01J 23/745* (2006.01)
- *B01J 23/75* (2006.01)
- *B01J 23/755* (2006.01)

(52) U.S. Cl.
CPC .......... *B01J 23/882* (2013.01); *B01J 23/883* (2013.01); *B01J 23/885* (2013.01); *B01J 23/888* (2013.01); *B01J 23/8877* (2013.01); *B01J 37/0201* (2013.01); *B01J 38/18* (2013.01); *C10G 3/44* (2013.01); *C10G 3/50* (2013.01); *C10L 1/026* (2013.01); *C10L 1/08* (2013.01); *C11C 3/126* (2013.01); *B01J 23/30* (2013.01); *B01J 23/34* (2013.01); *B01J 23/42* (2013.01); *B01J 23/44* (2013.01); *B01J 23/462* (2013.01); *B01J 23/468* (2013.01); *B01J 23/745* (2013.01); *B01J 23/75* (2013.01); *B01J 23/755* (2013.01); *C10L 2200/0469* (2013.01); *C10L 2290/06* (2013.01); *Y02E 50/13* (2013.01); *Y02P 30/20* (2015.11)

(56) References Cited

U.S. PATENT DOCUMENTS

| | | | |
|---|---|---|---|
| 7,232,935 | B2 | 6/2007 | Jakkula et al. |
| 7,279,018 | B2 | 10/2007 | Jakkula et al. |
| 2001/0001450 | A1 | 5/2001 | Markley et al. |
| 2006/0207166 | A1 | 9/2006 | Herskowitz et al. |
| 2007/0006523 | A1 | 1/2007 | Myllyoja et al. |
| 2007/0010682 | A1 | 1/2007 | Myllyoja et al. |
| 2007/0170091 | A1 | 7/2007 | Monnier et al. |
| 2007/0175795 | A1 | 8/2007 | Yao et al. |
| 2007/0275845 | A1* | 11/2007 | Jansen ............... B01J 23/85 502/24 |
| 2008/0154073 | A1* | 6/2008 | Petri ............... C10G 3/46 585/240 |
| 2008/0173570 | A1* | 7/2008 | Marchand ............ C10G 45/02 208/107 |

FOREIGN PATENT DOCUMENTS

| | | |
|---|---|---|
| EP | 1537912 A1 | 6/2005 |
| WO | 0123501 A1 | 4/2001 |
| WO | 2007068795 A1 | 6/2007 |
| WO | 2008058664 A | 5/2008 |
| WO | 2008113492 A1 | 9/2008 |
| WO | 2008113492 A8 | 2/2009 |

OTHER PUBLICATIONS

Chinese Office Action dated Jan. 23, 2015 for CN 201080065348.9 (10 pages).

Extended European Search Report, EP Application 10845856.3, dated Feb. 17, 2014 (8 pages).

* cited by examiner

CATALYST FOR PRODUCING HYDROGENATED BIODIESEL AND METHOD OF PRODUCING THE SAME

RELATED APPLICATIONS

The present application is a divisional application of co-pending U.S. patent application Ser. No. 13/578,225, which is a United States national phase application under 35 USC § 371 of PCT/KR2010/007184 filed on Oct. 20, 2010, which claims priority to Republic of Korea Patent Application 10-2010-0012711 filed on Feb. 11, 2010, all of which are incorporated by reference in their entireties in the present application.

TECHNICAL FIELD

The present invention relates to a catalyst for producing biodiesel and a method of producing biodiesel using the same, and, more particularly, to a catalyst which is used to produce biodiesel and has strong water resistance.

BACKGROUND ART

The necessities of developing alternative energy resources and reducing greenhouse gas emissions have been on the rise all over the world in correspondence with the high oil price, and thus the development of bioenergy resources has been actively conducted. Moreover, all over the world, the supply of biodiesel is increasing according to the improvement of taxation systems and laws, and thus the market related to bioenergy becomes bigger at a growth rate of 8~12% per year.

A typical technology of producing a diesel fraction from biomass is a technology of producing fatty acid methyl ester (FAME). Fatty acid methyl ester (FAME), which is an alternative energy source produced from biomass, is advantageous in that its cetane number is higher than that of a diesel fraction produced from mineral oil, but is disadvantageous in that its oxidation stability is low and its production costs are high.

As a next-generation alternative energy source, hydrogenated biodiesel (HBD), which is produced by directly hydrogenating triglycerides through a hydrotreating reaction, has been proposed. The production cost of hydrogenated biodiesel (HBD) is higher than that of diesel produced from mineral oil, but is lower than that of fatty acid methyl ester (FAME). Further, the oxidation stability of hydrogenated biodiesel (HBD) is relatively high because it is produced through a hydrotreating reaction.

Furthermore, hydrogenated biodiesel (HBD) is advantageous in that it can be used to produce high-grade diesel oil having a cetane number of approximately 100, and in that it is excellent in terms of energy efficiency or greenhouse gas emission reduction compared to mineral oil or FAME.

However, the biggest problem in a HBD producing process is that it is difficult to maintain the activity of a catalyst for a long period of time. Currently, a commercial hydrotreating catalyst is used in a HBD producing process, but the commercial hydrotreating catalyst is disadvantageous in that its carrier is leached out by water, which is a byproduct formed in the HBD catalytic reaction, and thus its catalytic activity is gradually decreased. In order to solve this problem, to date, a method of minimizing the deactivation of the hydrotreating catalyst by changing operation conditions so that a small amount of triglycerides is added to mineral oil without using only the triglycerides as a feed has been used.

HBD producing processes are largely classified into two types. One is a HBD producing process including only a hydrotreating process, and the other is a HBD producing process including a hydrotreatment process and an isomerization process.

In the HBD producing process, the hydrotreatment process is a process of hydrotreated fat or fatty acid through a hydrotreating reaction. This hydrotreatment process is similar to a hydrotreating process, a deoxygenation process, a hydrodeoxygenation process, a decarboxylation process or a decarbonylation process. That is, in the HBD producing process, the decarboxylation or decarbonylation process is similarly used together with the hydrotreatment process because one carbon atom in the fat or fatty acid is hydrotreated in the decarboxylation or decarbonylation process.

Generally, the plant oil used as a feed for producing biodiesel is composed of triglycerides. When this ester type triglyceride is hydrotreated, a paraffin of C15~C18 can be obtained. Since the obtained paraffin has a boiling point corresponding to that of diesel oil, it can be used as biodiesel. However, since this paraffin-based biodiesel has a high pour point, its low-temperature stability may be improved through an isomerization reaction in order to maintain it in a liquid state even at low temperature. Currently, since the used amount of biodiesel is only several percent (%) of the used amount of conventional petroleum diesel, if necessary, the biodiesel may be selectively isomerized.

Technologies of producing HBD using hydrotreatment are disclosed in the following documents. U.S. Pat. No. 4,992,605 discloses a process of producing biodiesel, in which crude palm oil is used as a feed and in which CoMo, NiMo or a transition metal is used as a hydrotreating catalyst.

U.S. Patent Application Publication NO. 2007-0175795 discloses a process of producing hydrogenated biodiesel, in which Ni, Co, Fe, Mn, W, Ag, Au, Cu, Pt, Zn, Sn, Ru, Mo, Sb, V, Ir, Cr or Pd is used as a catalyst for hydrotreating triglyceride.

U.S. Pat. No. 7,232,935 discloses a process of producing HBD, in which plant oil, as a feed, is formed into HBD by sequentially performing a hydrotreating process and an isomerization process.

U.S. Pat. No. 7,279,018 discloses a process of producing HBD, in which the hydrotreated and isomerized HBD is mixed with 0~20% of an antioxidative material to form a product.

U.S. Patent Application Publication NO. 2007-0010682 discloses a process of producing HBD including a hydrotreatment process and an isomerization process, in which a raw material includes 5 wt % or more of free fatty acid and a diluent, and the ratio of diluent:raw material is 5~30:1.

U.S. Patent Application Publication NO. 2006-0207166 discloses a process of producing HBD including a hydrotreatment process and an isomerization process, in which the hydrotreatment process and isomerization processes are simultaneously conducted using a catalyst in which an acidic carrier is supported with metals.

As described above, currently, HBD is being produced by directly applying a commercial hydrotreating catalyst to a process of producing HBD or by the catalyst that reformed commercial hydrotreating catalyst to the process of producing HBD. The conventionally commercial hydrotreating catalyst used alumina, silica-alumina, etc, as carrier.

However, when the commercial hydrotreating catalyst was used in the process of producing HBD, there was a serious problem in that the catalyst has low long term stability, although it has seemed initially high activity and selectivity.

Prior arts have many efforts to overcome the problem but have been limitedly solved through process operation control, such as a process of recycling the reacted HBC fraction but prior arts cannot have found the fundamental causes of low long term catalyst stability.

DISCLOSURE OF INVENTION

Technical Problem

Accordingly, the present invention has been made to overcome the above problems, and the present invention provides a catalyst for producing biodiesel, which has high long term stability and activity.

Further, the present invention provides a method of producing biodiesel using the catalyst.

Furthermore, the present invention provides biodiesel produced by the method.

Solution to the Problem

In order to solve the above problems, an aspect of the present invention provides a catalyst for producing biodiesel, including a carrier having water resistance and an active component supported on the carrier and used in a hydrotreting reaction or a decarboxylation reaction.

The catalyst may include a group VIB metal as the active component supported on the carrier.

The catalyst may include a group VIM metal or a group VIII metal as the active component supported on the carrier.

The carrier may be selected from among zirconia, titania, aluminum phosphate, niobia, zirconium phosphate, titanium phosphate, silicon carbide, carbon and mixtures thereof.

The group VIB metal may be Mo or W, and the amount thereof may be 0.1~70 wt % among total active agent.

The group VIII metal may be Ni, Pd or Pt, and the amount thereof may be 0~60 wt % among total active agent.

The group VIIB metal may be Co, Ru, Fe, Mn or Ir, and the amount thereof may be 0~60 wt % among total active agent.

The group VIB metal may be present in an amount of 1~40 wt % based on the carrier.

The group VIII metal or group VIIB metal may be present in an amount of 1~20 wt % based on the carrier.

Another aspect of the present invention provides a method of producing biodiesel through a hydrotreating reaction or a decarboxylation reaction in the presence of the catalyst for producing biodiesel.

In the method, biomass, such as plant oil, plant fat, animal fat, fish oil, recycled fat, plant fatty acids, animal fatty acids or mixtures thereof, may be used as a feed.

The plant fat, animal fat or recycled fat includes triglycerides, each chain of which is composed of 1~28 carbon atoms, and each of the plant fatty acids or animal fatty acids has 1~28 carbon atoms.

In the method, in addition to the biomass, one or more hydrocarbon mixtures (0~99%) may be used as the feed.

The method comprises the steps of: pretreating a feed through hydrotreatment; separating unreacted hydrogen after a hydrodeoxygenation reaction to form hydrocarbons; and cooling, separating and isomerizing the formed hydrocarbons.

Still another aspect of the present invention provides biodiesel produced by the method.

Advantageous Effects of Invention

As described above, the catalyst for producing biodiesel according to the present invention is advantageous in that it has high long-term activity and is not leached, thus improving long term stability.

BRIEF DESCRIPTION OF DRAWINGS

The above and other objects, features and advantages of the present invention will be more clearly understood from the following detailed description taken in conjunction with the accompanying drawings, in which.

BEST MODE FOR CARRYING OUT THE INVENTION

Figure 1:
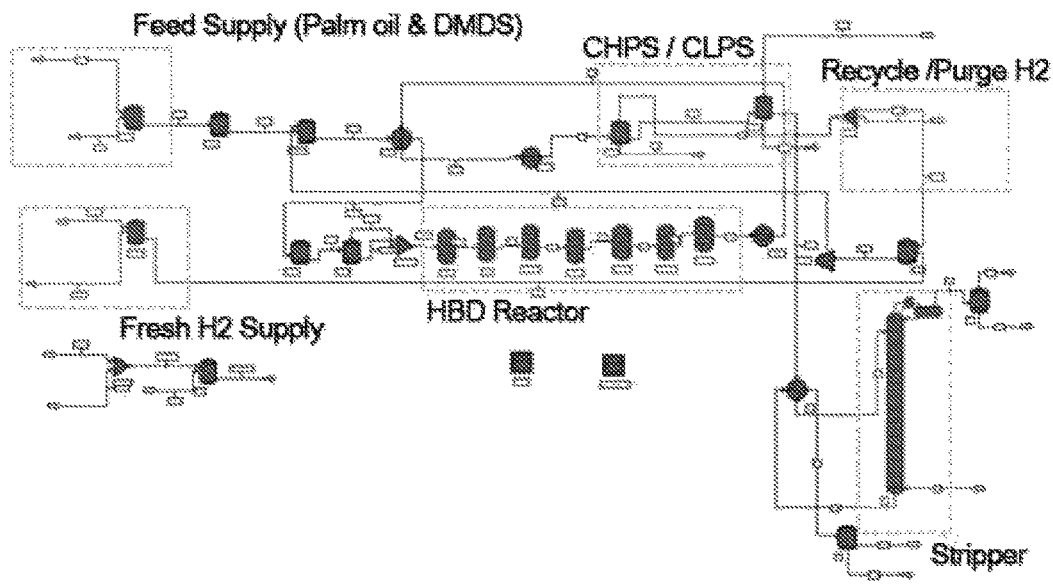
FIG. 1 is a view showing a process of producing HBD when only plant oil is used as a feed.

Hereinafter, preferred embodiments of the present invention will be described in detail with reference to the attached drawings.

When the commercial hydrotreating catalyst is used to produce HBD, it is difficult to produce HBD for a long period of time since the hydrotreating catalysts has become deactivate. As previous stated, prior arts have many efforts to overcome the problem but has been limitedly solved through process operation control, such as a process of recycling the reacted HBC fraction but a catalyst specified in the HBD reaction has not been developed yet.

The present inventors found the fundamental cause of lowering long-term catalyst activity that the side reaction in the process of HBD formation reaction produced the water which leached out the active sites of catalyst thus resulted in the deactivation of catalyst.

Therefore, the present inventors minimized the deactivation of the catalyst by introducing active sites into a water-resistant carrier having a hydrogenation function. Further, in the course of the present research, it was found that the hydrotreating catalyst manufactured using the technology of the present invention maintains higher long-term catalyst activity than that of the commercial hydrotreating catalyst by two fold or more in the process of producing HBD.

Plant oil mainly consists of triglycerides. As below figure, in the general hydrotreating process, triglycerides reacted by hydrogen produces normal paraffin such as C14-C18 and byproducts such as propane, $H_2O$, CO, $CO_2$.

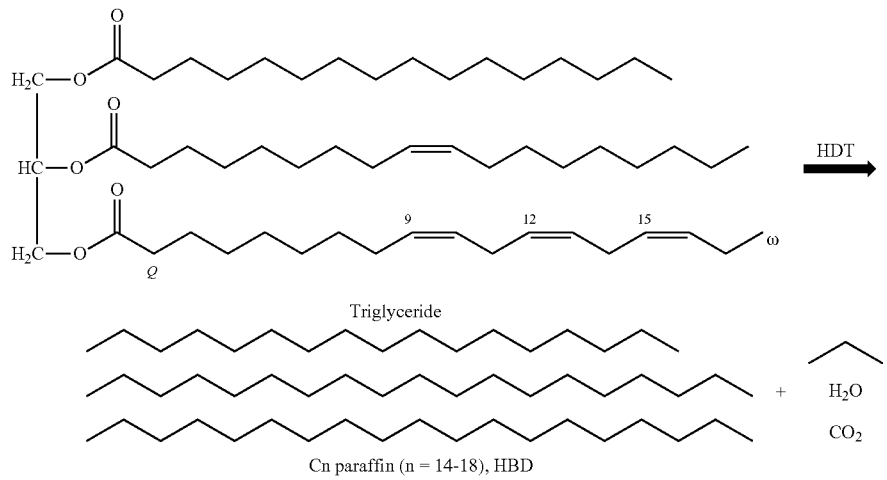

Triglyceride

Cn paraffin (n = 14-18), HBD

The paraffin produced at this time is C14-C18, and it is commonly named as HBD since it is diesel oil. The above produced H2O unavoidably results in dissolving the catalyst. When Group III+Group IV metal/carrier catalyst of the commercial hydrotreating catalyst is used, H2O is produced with rate of about 10 wt %. After a while a small amount of water does not influence the leaching out of catalyst carrier very much, increased amount of water causes the carrier to be leached out and thus the catalyst to be deactivated.

The present invention provides a catalyst for producing biodiesel, including a carrier having water resistance and an active component supported on the carrier and used in a hydrotreating reaction or a decarboxylation reaction.

The carrier used in the present invention is selected from among zirconia, titania, aluminum phosphate, niobia, zirconium phosphate, titanium phosphate, silicon carbide, carbon and mixtures thereof.

The present invention provides a catalyst for producing HBD (hydrogenated biodiesel), which is used to produce a diesel fraction from biomass through a hydrotreating reaction or a decarboxylation reaction, and which is a catalyst formed by adding an active material having a hydrogenation function or a decarboxylation function to a carrier having strong water resistance, such as zirconia, titania, aluminum phosphate, niobia, zirconium phosphate, titanium phosphate, silicon carbide, carbon and mixtures thereof or the like. In the catalyst of the present invention, a carrier having strong water resistance is used, so that the deactivation of the catalyst due to the water produced through a process of producing HBD can be prevented, thereby remarkably improving the long term stability of the catalyst.

The catalyst used in the present invention can be applied to a hydrotreating reaction or a decarboxylation reaction using an alumina declining durability of carrier due to generated water as well as to a process of producing HBD.

When the catalyst of the present invention is used in a process of producing HBD, the catalyst used in a hydrotreating reaction or a decarboxylation reaction can be used in the process of producing HBD without limitation, and the catalyst in which a carrier is supported with a group VIB metal as an active component can also be used in the process of producing HBD.

Further, in the catalyst of the present invention, a carrier having strong water resistance can be supported with a group VIB metal or a group VIIB metal as another active component in addition to the group VIB metal.

As the active component used in the present invention, the group VIB metal may be Mo or W, the group VIII metal may be Ni, Pd or Pt, and the group VIIB metal may be Co, Ru, Fe, Mn or Ir, but the present invention is not limited thereto.

The catalyst of the present invention includes 0.1~70 wt % of a group VIB metal as an active component. When the amount of the group VIB metal included in the catalyst is less than 0.1 wt %, the activity of the catalyst is very low, thus the catalyst cannot serve as a catalyst. When the amount thereof is more than 70 wt %, it is difficult to support the group VIB metal on the catalyst in an oxidation state. Preferably, the amount of the group VIB metal may be 1~40 wt %.

Further, the catalyst of the present invention includes 0~60 wt % of a group VIII metal or a group VIIB metal as an active component. When the amount of the group VIII metal or group VIIB metal is more than 60 wt %, it is difficult to support the group VIII metal or group VIIB metal on the catalyst. Preferably, the amount of the group VIII metal or group VIIB metal is 0~20 wt %.

In the process of producing biodiesel according to the present invention, biomass, such as plant oil, plant fat, animal fat, fish oil, recycled fat, plant fatty acids, animal fatty acids or mixtures thereof, can be used as a feed.

As the plant fat, animal fat or recycled fat, fat including triglycerides, each chain of which is composed of 1~28 carbon atoms may be used, and, as the plant fatty acids or animal fatty acids, fatty acids having 1~28 carbon atoms may be used, but the present invention is not limited thereto.

In the process of producing biodiesel, in addition to the biomass, one or more hydrocarbon mixtures (0~99%) may be used as a feed. This hydrocarbon may include kerosene, diesel, light gas oil (LGO), and recycled HBD, but the present invention is not limited thereto.

The process of producing biodiesel may include the steps of: pretreating a feed through hydrotreatment; separating unreacted hydrogen after a hydrodeoxygenation reaction to form hydrocarbons; and cooling, separating and isomerizing the formed hydrocarbons. If necessary, one or two steps may be added or omitted.

A process of producing HBD using only plant oil as a feed is shown in FIG. 1, but is not limited thereto.

Figure 2:
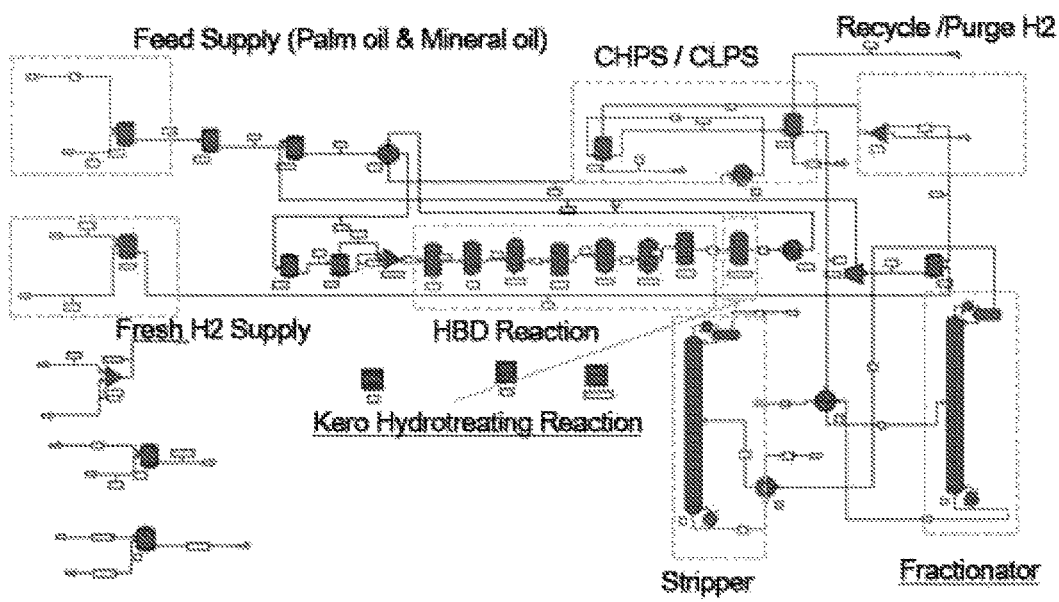
FIG. 2 is a view showing a process of producing HBD when a mixture of plant oil and hydrocarbons is used as a feed.

FIG. 2 is a view showing a process of producing HBD when a mixture of plant oil and hydrocarbons is used as a feed. The process of producing HBD using the mixture of plant oil and hydrocarbons is different from the process of producing HBD using the only plant oil in the point that a fractionator for separating hydrocarbons is required.

In the process of producing HBD, a mixture in which 1% of dimethyl disulfide (DMDS) is mixed with plant oil is also used as a feed. This feed is simultaneously introduced into a HBD reactor together with hydrogen, and then hydrotreated to form a reaction product. The reaction product is distilled in a stripper and then fractionated according to boiling point. Thus, among the fractionated reaction product, HBD is selectively extracted, and others are recycled.

Mode for the Invention

Hereinafter, a catalyst for producing HBD and a method of producing biodiesel through a hydrotreating process using the catalyst will be described in detail with reference to the following Examples.

EXAMPLES

Example 1: Preparation of a Mo/ZrO$_2$ Catalyst

A catalyst containing about 10 wt % of molybdenum (Mo) was prepared using a zirconia (ZrO2) carrier having a diameter of 1 mm.

Ammonium heptamolybdate tetrahydrate (hereinafter, referred to as "AHM") was used a molybdenum (Mo) precursor. A zirconia (ZrO2) carrier was impregnated with an aqueous solution formed by dissolving AHM in distilled water, dried at a temperature of 150° C. for 2 hours, and then continuously calcined at a temperature of 500° C. for 2 hours to prepare a Mo/ZrO$_2$ catalyst (here, in addition to AHM, various types of molybdenum (Mo) precursors may be used, and the molybdenum (Mo) precursor is not limited to AHM).

6 cc of the Mo/ZrO$_2$ catalyst prepared through the above procedures was charged in a cylindrical reactor, and then heated to a temperature of 400° C. while introducing hydrogen (H2) into the cylindrical reactor at a flow rate of 16 cc/min with R-LGO including 3 wt % of DMDS at the flow rate of 0.08 cc/min and a reaction pressure of 45 bars, and then pretreated for 3 hours at a temperature of 400° C.

Subsequently, as a feed, soybean oil including 1% of dimethyl disulfide (DMDS) was reacted at a reaction rate of 0.1 cc/min (LHSV=1) using the pretreated Mo/ZrO$_2$ catalyst under the conditions of a reaction temperature of 350° C., a reaction pressure of 30 bars and a hydrogen flow rate of 100 cc/min. Sampling was conducted every 8 hours to obtain reaction products. The patterns of the obtained reaction products were observed through simulated distillation, and whether the Mo/ZrO$_2$ catalyst was leached was confirmed through ICP analysis. The results thereof are given in Table 1 and Table 2.

Example 2: Preparation of a NiMo/ZrO$_2$ Catalyst

A catalyst containing about 10 wt % of molybdenum (Mo) and about 3 wt % of nickel (Ni) was prepared using a zirconia (ZrO2) carrier having a diameter of 1 mm. Ammonium heptamolybdate tetrahydrate (hereinafter, referred to as "AHM") was used a molybdenum (Mo) precursor, and nickel nitrate hexahydrate (hereinafter, referred to as "NNH") was used as a nickel (Ni) precursor. Here, various types of molybdenum (Mo) precursors and various types of nickel (Ni) precursors may be used, and the molybdenum (Mo) precursor and nickel (Ni) precursor are not limited to AHM and NNH, respectively.

A NiMo/ZrO2 catalyst was prepared through the following procedures.

First, a zirconia (ZrO2) carrier was impregnated with an aqueous solution formed by dissolving AHM in distilled water, dried at a temperature of 150° C. for 2 hours, and then continuously calcined at a temperature of 500° C. for 2 hours to prepare a Mo/ZrO$_2$ catalyst.

Subsequently, the Mo/ZrO$_2$ catalyst was impregnated with an aqueous solution formed by dissolving NNH in distilled water, dried at a temperature of 150° C. for 2 hours, and then continuously calcined at a temperature of 500° C. for 2 hours to prepare a NiMo/ZrO$_2$ catalyst.

Thereafter, subsequent procedures were conducted as in Example 1, except that the pretreatment of the NiMo/ZrO$_2$ catalyst was performed at a temperature of 320° C. The results thereof are given in Table 1 and Table 2.

Example 3: Preparation of a CoMo/TiO$_2$ Catalyst

A catalyst containing about 10 wt % of molybdenum (Mo) and about 3 wt % of cobalt (Co) was prepared using a titania (TiO2) carrier having a diameter of 1 mm. Ammonium heptamolybdate tetrahydrate (hereinafter, referred to as "AHM") was used a molybdenum (Mo) precursor, and cobalt nitrate hexahydrate (hereinafter, referred to as "CNH") was used as a cobalt (Co) precursor. Here, various types of molybdenum (Mo) precursors and various types of cobalt (Co) precursors may be used, and the molybdenum (Mo) precursor and cobalt (Co) precursor are not limited to AHM and CNH, respectively.

A CoMo/TiO$_2$ catalyst was prepared through the following procedures.

First, a titania (TiO2) carrier was impregnated with an aqueous solution formed by dissolving AHM in distilled water, dried at a temperature of 150° C. for 2 hours, and then continuously calcined at a temperature of 500° C. for 2 hours to prepare a Mo/TiO$_2$ catalyst.

Subsequently, the Mo/TiO$_2$ catalyst was impregnated with an aqueous solution formed by dissolving CNH in distilled water, dried at a temperature of 150° C. for 2 hours, and then continuously calcined at a temperature of 500° C. for 2 hours to prepare a CoMo/TiO$_2$ catalyst.

Thereafter, subsequent procedures were conducted as in Example 2. The results thereof are given in Table 1 and Table 2.

Example 4: Preparation of a NiW/TiO$_2$ Catalyst

A catalyst containing about 10 wt % of tungsten (W) and about 3 wt % of nickel (Ni) was prepared using a titania (TiO2) carrier having a diameter of 1 mm. Ammonium metatungstate hydrate (hereinafter, referred to as "AMT") was used a tungsten (W) precursor, and nickel nitrate hexahydrate (hereinafter, referred to as "NNH") was used as a nickel (Ni) precursor. Here, various types of tungsten (W) precursors and various types of nickel (Ni) precursors may be used, and the tungsten (W) precursor and nickel (Ni) precursor are not limited to AMT and NNH, respectively.

A NiW/TiO$_2$ catalyst was prepared through the following procedures.

First, a titania (TiO2) carrier was impregnated with an aqueous solution formed by dissolving AMT in distilled water, dried at a temperature of 150° C. for 2 hours, and then continuously calcined at a temperature of 500° C. for 2 hours to prepare a W/TiO$_2$ catalyst.

Subsequently, the W/TiO2 catalyst was impregnated with an aqueous solution formed by dissolving NNH in distilled water, dried at a temperature of 150° C. for 2 hours, and then continuously calcined at a temperature of 500° C. for 2 hours to prepare a NiW/TiO$_2$ catalyst.

Thereafter, subsequent procedures were conducted as in Example 2. The results thereof are given in Table 1 and Table 2.

Example 5: Preparation of a NiMo/C Catalyst

A catalyst containing about 15 wt % of molybdenum (Mo) and about 5 wt % of nickel (Ni) was prepared using a carbon (C) carrier having a diameter of 1 mm. Ammonium heptamolybdate tetrahydrate (hereinafter, referred to as "AHM") was used a molybdenum (Mo) precursor, and nickel nitrate hexahydrate (hereinafter, referred to as "NNH") was used as a nickel (Ni) precursor. Here, various types of molybdenum (Mo) precursors and various types of nickel (Ni) precursors may be used, and the molybdenum (Mo) precursor and nickel (Ni) precursor are not limited to AHM and NNH, respectively.

A NiMo/C catalyst was prepared as follows.

A carbon (C) carrier was impregnated with an aqueous solution formed by dissolving AHM and NNH in distilled water, and then dried at a temperature of 300° C. for 2 hours to prepare a NiMo/C catalyst.

Thereafter, subsequent procedures were conducted as in Example 2. The results thereof are given in Table 1 and Table 2.

Example 6: Preparation of a NiMo/AlPO4 Catalyst

A catalyst containing about 15 wt % of molybdenum (Mo) and about 5 wt % of nickel (Ni) was prepared using a aluminum phosphate (AlPO4) carrier. Molybdenum (Mo) precursor, and nickel (Ni) precursor can be used like those of Example 2, respectively.

A NiMo/AlPO4 catalyst was prepared through the following procedures.

First, a aluminum phosphate (AlPO4) carrier was impregnated with an aqueous solution formed by dissolving AHM and NNH in distilled water, dried at a temperature of 150° C. for 2 hours, and then pretreated as in Example 2.

The results thereof are given in Table 1 and Table 2.

Example 7: Preparation of a NiMo/Nb2O5 Catalyst

A catalyst containing about 7 wt % of molybdenum (Mo) and about 2 wt % of nickel (Ni) was prepared using a niobium oxide (Nb2O5) carrier. Molybdenum (Mo) precursor, and nickel (Ni) precursor can be used like those of Example 2, respectively.

A NiMo/Nb2O5 catalyst was prepared through the following procedures.

First, a aluminum phosphate (AlPO4) carrier was impregnated with like Example 6 and then pretreated as in Example 2.

The results thereof are given in Table 1 and Table 2.

Comparative Example 1: Preparation of a NiMo/Al$_2$O$_3$ Catalyst

A catalyst containing about 10 wt % of molybdenum (Mo) and about 3 wt % of nickel (Ni) was prepared using an alumina (Al2O3) carrier having a diameter of 1 mm. Ammonium heptamolybdate tetrahydrate (hereinafter, referred to as "AHM") was used a molybdenum (Mo) precursor, and nickel nitrate hexahydrate (hereinafter, referred to as "NNH") was used as a nickel (Ni) precursor. Here, various types of molybdenum (Mo) precursors and various types of nickel (Ni) precursors may be used, and the molybdenum (Mo) precursor and nickel (Ni) precursor are not limited to AHM and NNH, respectively.

A NiMo/Al2O3 catalyst was prepared through the following procedures.

First, an alumina (Al2O3) carrier was impregnated with an aqueous solution formed by dissolving AHM in distilled water, dried at a temperature of 150° C. for 2 hours, and then continuously calcined at a temperature of 500° C. for 2 hours to prepare a Mo/Al2O3 catalyst.

Subsequently, the Mo/Al2O3 catalyst was impregnated with an aqueous solution formed by dissolving 3.06 g of NNH in distilled water, dried at a temperature of 150° C. for 2 hours, and then continuously calcined at a temperature of 500° C. for 2 hours to prepare a NiMo/Al2O3 catalyst.

Thereafter, subsequent procedures were conducted as in Example 2. The results thereof are given in Table 1 and Table 2.

Comparative Example 2: Preparation of a CoMo/Al$_2$O$_3$ Catalyst

A catalyst containing about 10 wt % of molybdenum (Mo) and about 3 wt % of cobalt (Co) was prepared using an alumina (Al2O3) carrier having a diameter of 1 mm. Ammonium heptamolybdate tetrahydrate (hereinafter, referred to as "AHM") was used a molybdenum (Mo) precursor, and cobalt nitrate hexahydrate (hereinafter, referred to as "CNH") was used as a cobalt (Co) precursor. Here, various types of molybdenum (Mo) precursors and various types of cobalt (Co) precursors may be used, and the molybdenum (Mo) precursor and cobalt (Co) precursor are not limited to AHM and CNH, respectively.

A CoMo/Al2O3 catalyst was prepared through the following procedures.

First, an alumina (Al2O3) carrier was impregnated with an aqueous solution formed by dissolving AHM in distilled water, dried at a temperature of 150° C. for 2 hours, and then continuously calcined at a temperature of 500° C. for 2 hours to prepare a Mo/Al2O3 catalyst.

Subsequently, the Mo/Al2O3 catalyst was impregnated with an aqueous solution formed by dissolving CNH in distilled water, dried at a temperature of 150° C. for 2 hours, and then continuously calcined at a temperature of 500° C. for 2 hours to prepare a CoMo/Al2O3 catalyst.

Thereafter, subsequent procedures were conducted as in Example 2. The results thereof are given in Table 1 and Table 2.

From Table 1, in the case of the catalysts prepared using an alumina (Al2O3) carrier, it can be seen that yields rapidly decrease with the passage of reaction time although initial activity is good. In contrast, in the case of the catalysts prepared using a zirconia (ZrO2) carrier, a titania (TiO2) carrier, a carbon (C) carrier, aluminum phosphate carrier, or niobia carrier, as given in Table 1, it can be seen that their initial activity and long-term stability are excellent compared to those of the catalysts prepared using an alumina (Al2O3) carrier. In particular, as given in Table 2, the catalysts prepared using a zirconia (ZrO2) carrier, a titania (TiO2) carrier, a carbon (C) carrier, aluminum phosphate carrier, or niobia carrier have excellent water resistance and do not cause a catalyst dissolving phenomenon, but in the catalysts prepared using an alumina (Al2O3) carrier, their catalyst and carrier component are leached out therefrom and they are rapidly dissolved with the passage of reaction time.

TABLE 1

| Catalyst/diesel selectivity (%) | 1 day | 15 days | 30 days |
|---|---|---|---|
| Mo/ZrO$_2$ | 83 | 84 | 80 |
| NiMo/ZrO$_2$ | 86 | 88 | 89 |
| CoMo/TiO$_2$ | 84 | 85 | 86 |
| NiW/TiO$_2$ | 89 | 89 | 87 |
| NiMo/C | 82 | 82 | 81 |
| NiMo/AlPO$_4$ | 81 | 80 | 80 |
| NiMo/Nb$_2$O$_5$ | 78 | 78 | 77 |
| NiMo/Al$_2$O$_3$ | 82 | 79 | 74 |
| CoMo/Al$_2$O$_3$ | 82 | 78 | 76 |

TABLE 2

| Catalyst/composition (wppm) | 1 day | | | | | | 15 days | | | | | | 30 days | | | | | |
|---|---|---|---|---|---|---|---|---|---|---|---|---|---|---|---|---|---|---|
| | Ni | Co | Mo | Zr | Ti | Al | Ni | Co | Mo | Zr | Ti | Al | Ni | Co | Mo | Zr | Ti | Al |
| Mo/ZrO$_2$ | 0 | 0 | 0 | 0 | 0 | 0 | 0 | 0 | 0 | 0 | 0 | 0 | 0 | 0 | 0 | 0 | 0 | 0 |
| NiMo/ZrO$_2$ | 0 | 0 | 0 | 0 | 0 | 0 | 0 | 0 | 0 | 0 | 0 | 0 | 0 | 0 | 0 | 0 | 0 | 0 |
| CoMo/TiO$_2$ | 0 | 0 | 0 | 0 | 0 | 0 | 0 | 0 | 0 | 0 | 0 | 0 | 0 | 0 | 0 | 0 | 0 | 0 |
| NiW/TiO$_2$ | 0 | 0 | 0 | 0 | 0 | 0 | 0 | 0 | 0 | 0 | 0 | 0 | 0 | 0 | 0 | 0 | 0 | 0 |
| NiMo/C | — | — | — | — | — | — | — | — | — | — | — | — | — | — | — | — | — | — |
| NiMo/AlPO$_4$ | 0 | 0 | 0 | 0 | 0 | 0 | 0 | 0 | 0 | 0 | 0 | 0 | 0 | 0 | 0 | 0 | 0 | 0 |
| NiMo/Nb$_2$O$_5$ | 0 | 0 | 0 | 0 | 0 | 0 | 0 | 0 | 0 | 0 | 0 | 0 | 0 | 0 | 0 | 0 | 0 | 0 |
| NiMo/Al$_2$O$_3$ | 0 | 0 | 0 | 0 | 0 | 0 | 0 | 0 | 0 | 0 | 0 | 57 | 0 | 0 | 1.3 | 0 | 0 | 1670 |
| CoMo/Al$_2$O$_3$ | 0 | 0 | 0 | 0 | 0 | 0 | 0 | 0 | 0 | 0 | 0 | 45 | 0 | 0 | 0.5 | 0 | 0 | 1250 |

As described above, the catalyst for producing biodiesel according to the present invention is advantageous in that it has high long-term activity and is not leached, thus improving long term stability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of producing biodiesel through a hydrotreating reaction or a decarboxylation reaction in the presence of a catalyst comprising a carrier having water resistance and an active component supported on the carrier and used in a hydrotreating reaction or a decarboxylation reaction, wherein the carrier is not alumina, and wherein the active component is not leached out when the catalyst has been reacted for 30 days.

2. The method of producing biodiesel according to claim 1, wherein the catalyst comprises a group VIB metal as the active component supported on the carrier.

3. The method of producing biodiesel according to claim 2, wherein the catalyst further comprises a group VIM metal or a group VIII metal as the active component supported on the carrier.

4. The method of for producing biodiesel according to claim 1, wherein the carrier is selected from among zirconia, titania, aluminum phosphate, niobia, zirconium phosphate, titanium phosphate, silicon carbide, carbon and mixtures thereof.

5. The method of for producing biodiesel according to claim 2, wherein the group VIB metal is Mo or W, and the amount thereof is 0.1-70 wt % among total active agent.

6. The method of for producing biodiesel according to claim 3, wherein the group VIII metal is Ni, Pd or Pt, and the amount thereof is more than 0 and less than or equal to 60 wt % among total active agent.

7. The method of producing biodiesel according to claim 3, wherein the group VIIB metal is Co, Ru, Fe, Mn or Ir, and the amount thereof is more than 0 and less than or equal to 60 wt % among total active agent.

8. The method of producing biodiesel according to claim 2, wherein the group VIB metal is present in an amount of 1-40 wt % based on the carrier.

9. The method of producing biodiesel according to claim 3, wherein the group VIII metal or group VIIB metal is present in an amount of more than 0 and less than or equal to 20 wt % based on the carrier.

10. The method of producing biodiesel according to claim 1, wherein biomass, such as plant oil, plant fat, animal fat, fish oil, recycled fat, plant fatty acids, animal fatty acids or mixtures thereof, is used as a feed.

11. The method of producing biodiesel according to claim 10, wherein the plant fat, animal fat or recycled fat includes triglycerides, each chain of which is composed of 1-28 carbon atoms, and each of the plant fatty acids or animal fatty acids has 1-28 carbon atoms.

12. The method of producing biodiesel according to claim 10, wherein, in addition to the biomass, one or more hydrocarbon mixtures are used as the feed.

13. The method of producing biodiesel according to claim 12, wherein the hydrocarbon includes kerosene, diesel, light gas oil, and recycled hydrogenated biodiesel.

14. The method of producing biodiesel according to claim 1, the method comprises the steps of: pretreating a feed through hydrotreatment; separating unreacted hydrogen after a hydrodeoxygenation reaction to form hydrocarbons; and cooling, separating and isomerizing the formed hydrocarbons.

* * * * *